(12) United States Patent
Hayashi et al.

(10) Patent No.: US 7,030,626 B2
(45) Date of Patent: Apr. 18, 2006

(54) HIGH-FREQUENCY OSCILLATION TYPE PROXIMITY SENSOR

(75) Inventors: Takumi Hayashi, Tokyo (JP); Shinichi Kawai, Tokyo (JP); Hiroshi Hatanaka, Tokyo (JP)

(73) Assignee: Yamatake Corporation, Tokyo (JP)

( * ) Notice: Subject to any disclaimer, the term of this patent is extended or adjusted under 35 U.S.C. 154(b) by 28 days.

(21) Appl. No.: 10/480,990

(22) PCT Filed: Jun. 17, 2002

(86) PCT No.: PCT/JP02/06017

§ 371 (c)(1),
(2), (4) Date: Dec. 16, 2003

(87) PCT Pub. No.: WO02/103905

PCT Pub. Date: Dec. 27, 2002

(65) Prior Publication Data

US 2004/0150412 A1    Aug. 5, 2004

(30) Foreign Application Priority Data

Jun. 18, 2001 (JP) ............................ 2001-182964
Jun. 18, 2001 (JP) ............................ 2001-182965
Apr. 5, 2002 (JP) ............................ 2002-104181

(51) Int. Cl.
*G01B 7/14* (2006.01)
*G01R 27/04* (2006.01)
*G01R 27/28* (2006.01)

(52) U.S. Cl. .................. 324/635; 324/655; 324/207.15

(58) Field of Classification Search ................ 324/635, 324/655, 207.15, 236; 331/176
See application file for complete search history.

(56) References Cited

U.S. PATENT DOCUMENTS

| 4,305,034 A | * | 12/1981 | Long et al. ................. 324/253 |
| 4,509,023 A | * | 4/1985 | Heimlicher ................. 331/176 |
| 4,942,372 A | | 7/1990 | Heimlicher |
| 5,278,523 A | * | 1/1994 | Kriz ........................ 331/176 |

FOREIGN PATENT DOCUMENTS

| JP | 58-24205 A | 2/1983 |
| JP | 1-212005 A | 8/1989 |
| JP | 3-029801 A | 2/1991 |
| JP | 5-63559 A | 3/1993 |
| JP | 10-075118 A | 3/1998 |

*Primary Examiner*—Anjan Deb
(74) *Attorney, Agent, or Firm*—Frishauf, Holtz, Goodman & Chick, P.C.

(57) ABSTRACT

A high-frequency oscillation proximity sensor with an improved detection sensitivity uses, as a detection coil 11, a two-thread coil formed of substantively two coil conductors joined together at their first ends to form a joint connection end and twisted together, one of the two coil conductors being used as a resonance circuit coil L1 and the other as a copper resistance compensation coil L2, and comprises a drive circuit 12 for supplying a drive current to the joint connection end of the two-thread coil to thereby drive the detection coil to oscillate, a buffer 13 for taking out an oscillating output voltage generated at the joint connection end of the two-thread coil, and a phase shift circuit 15 for turning the phase of the oscillating output voltage taken out by the buffer by a predetermined angle and feeding it back to the copper resistance compensation coil to thereby negate the copper resistance of the two-thread coil. The drive circuit comprises a nonlinear amplifier 21 for changing the amplitude of the oscillating voltage generated at the two-thread coil in multiple stages to thereby impart a soft oscillation characteristic to a high-frequency oscillation circuit comprising the nonlinear amplifier and the two-thread coil.

6 Claims, 6 Drawing Sheets

US 7,030,626 B2

HIGH-FREQUENCY OSCILLATION TYPE PROXIMITY SENSOR

This application is a U.S. National Phase Application under 35 USC 371 of International Application PCT/JP02/06017 filed Jun. 17, 2002.

TECHNICAL FIELD

The invention relates to a high-frequency oscillation proximity sensor for detecting proximity of an object of detection on the basis of change in oscillating output voltage (amplitude) of a high-frequency oscillator circuit due to electromagnetic induction occurring between a detection coil which forms part of the high-frequency oscillation proximity sensor and the object.

The invention relates particularly to a high-frequency oscillation proximity sensor using, as a detection coil, a two-thread coil formed of substantively two coil conductors each having a first end and a second end, joined together at their respective first ends and twisted together, one of the two coil conductors being used as a resonance circuit coil and the other as an internal resistance compensation coil, wherein detection sensitivity is improved by virtually (equivalently) short-circuiting an internal resistance (so-called copper resistance) of the two-thread coil.

BACKGROUND ART

As a type of proximity sensor for detecting presence (proximity) of an object of detection in a non-contact manner, there is known a high-frequency oscillation proximity sensor. FIG. 11 shows schematically an example of structure of a high-frequency oscillation proximity sensor of this type. As seen there, the high-frequency oscillation proximity sensor of this type has an oscillator circuit 2 including a detection coil 1. When an electrically conductive object S (for example, a metal object) is present near the detection coil 1, Q of the detection coil 1 changes. On the basis of this change, presence or proximity of the object S is detected.

Specifically, when the object S of detection is present near the detection coil 1, the resistance R and self-inductance L of the detection coil 1 changes due to electromagnetic induction occurring between the detection coil 1 and the object S. Due to this change, the oscillation amplitude and oscillation frequency of the oscillator circuit 2 changes. In the high-frequency oscillation proximity sensor, for example, the oscillation amplitude of the oscillator circuit 2 is detected by a detector circuit 3, and presence or proximity of the object S is detected on the basis of the detection output of the detector circuit 3 (the oscillation amplitude of the high-frequency oscillator circuit 2). Then, operation of an output circuit 4 is controlled, and, for example, a monitor-side load is selectively driven through a transistor 5 or an LED (light-emitting diode) 6 is driven to light to thereby make known (indicate) the presence or proximity of the object S. In FIG. 11, reference numeral 7 denotes a constant voltage circuit for supplying a drive voltage to the oscillator circuit 2, the detector circuit 3 and the like.

Regarding this type of high-frequency oscillation proximity sensor, it is required that not only detection characteristics should be stable but also a detection distance should be able to be long enough. Basically, these requirements can be met when temperature dependency of an internal resistance, i.e., a so-called copper resistance Rcu of the detection coil 1 is negated. Hence, for example, U.S. Pat. No. 4,509,023 and U.S. Pat. No. 4,942,372 propose a technique in which temperature compensation is made by applying a voltage proportional to the copper resistance Rcu, between the opposite ends of the detection coil 1.

FIG. 12 schematically shows a structure according to this technique. As shown there, a two-thread coil formed of two coil conductors each having a first end and a second end, joined together at their respective first ends and twisted together is used as a detection coil 1. One of the two coil conductors of the two-tread coil is connected to a resonance capacitor C1 and used as a resonance circuit coil L1, while the other coil conductor is used as an internal resistance compensation coil (copper resistance compensation coil) L2. Through an amplifier 8, a drive voltage Va is applied to the two-thread coil (detection coil) 1 so that the resonance circuit formed by the coil L1 and the capacitor C1 will oscillate. Also, the output of the amplifier 8 is fed back to the copper resistance compensation coil L2 with its phase turned by 90° through a capacitor C2.

In this circuit structure, however, it is necessary to find conditions for compensating for temperature dependency of the self-oscillation point of the resonance circuit, through regulating the resistance values of resistors R, P provided for the amplifier 8 and the capacitance of a capacitor C2 provided for voltage feedback. Also, the self-oscillation point needs to be optimized depending on the detection distance at which an object S should be detected. Thus, optimization of circuit constants is quite difficult. Particularly in order to negate the temperature dependency of the copper resistance Rcu of the detection coil 1, it is necessary to generate a voltage with an amplitude inversely proportional to the square ($\bar{\omega}^2$) of the angular frequency of $\bar{\omega}$ oscillation generated at the detection coil 1 and feed this voltage back to the copper resistance compensation coil L2. Thus, it is difficult to design a circuit which can surely negate the temperature dependency of the copper resistance Rcu, and therefore, it is difficult to stabilize the operating characteristics of the high-frequency oscillation proximity sensor.

A conventional common proximity sensor (proximity switch) is so arranged that when an object S of detection comes up to a certain distance, for example, the oscillator circuit 2 stops oscillating. The oscillator circuit 2 having an operating characteristic like this is generally called a hard oscillation circuit. In contrast, when an object S of detection should be detected at a plurality of points, or distances as it approaches, a so-called soft oscillation circuit having an operating characteristic such that the oscillation amplitude changes depending on the distance of the object S needs to be constructed.

The soft oscillation of the high-frequency oscillator circuit 2 means oscillation where the oscillation amplitude changes as the Q of the detection coil 1 changes. The Q of the detection coil 1 depends much on the internal resistance R of the detection coil 1 which changes depending on presence of an object S of detection. The Q of the detection coil is approximately given as [Q=$\bar{\omega}$L/R], where L is the self-inductance of the detection coil 1, and $\bar{\omega}$ is the resonance angular frequency of the LC resonance circuit formed by the detection coil 1 and the resonance capacitor C1. The change in Q of the detection coil due to presence of an object S can be represented by the ratio [Q ratio=Qin/Qout] of the value [Qin] which the Q takes when the object S is present near the detection coil 1 to the value [Qout] which the Q takes when the object S is not present.

In order to construct a soft oscillation circuit meeting the requirements that the operatiing characteristics should be stabilized and that the detection distance should be extended, it is necessary to change the oscillation amplitude of the high-frequency oscillator circuit depending on change in Q of the detection coil and also negate the temperature dependency of the copper resistance Rcu of the detection coil, for example, using a feedback circuit as mentioned above. This leads to problems such that the structure is complicated.

DISCLOSURE OF THE INVENTION

An object of the invention is to provide a high-frequency oscillation proximity sensor of a simple structure in which detection sensitivity is improved by virtually (equivalently) short-circuiting a copper resistance Rcu of a detection coil. Specifically, it is to provide a high-frequency oscillation proximity sensor of a simple structure in which detection sensitivity is improved by improving the Q and the Q ratio of a detection coil, and operating characteristics are stabilized by negating the temperature dependency of an oscillator circuit which comes from a copper resistance.

Another object of the invention is to provide a high-frequency oscillation proximity sensor of a simple structure in which a high-frequency oscillator circuit having an above-described detection coil can be a soft oscillation circuit.

In order to achieve these objects, a high-frequency oscillation proximity sensor according to the invention uses, as a detection coil, a two-thread coil formed of substantively two coil conductors each having a first end and a second end, joined together at their respective first ends to form a joint connection end and twisted together, one of the two coil conductors being used as a resonance circuit coil and the other as a copper resistance compensation coil, and comprises a drive circuit for supplying a drive current to the joint connection end of the two-thread coil for oscillation, a buffer for taking out an oscillating output voltage generated at the joint connection end of the two-thread coil, and a phase shift circuit for turning the phase of the oscillating output voltage taken out by the buffer by a predetermined angle and feeding it back to the copper resistance compensation coil to negate a copper resistance Rcu of the two-thread coil.

Desirably, the phase shift circuit has a resistor series-connected to the phase shift circuit, for determining that amount of the oscillating output voltage taken out by the buffer which should be fed back to the copper resistance compensation coil. Further, the phase shift circuit has a phase turning angle control means for controlling an angle by which the phase of the oscillating output voltage taken out by the buffer should be turned.

Another high-frequency oscillation proximity sensor according to the invention uses, as a detection coil, a two-thread coil formed of substantively two coil conductors each having a first end and a second end, joined together at their respective first ends to form a joint connection end and twisted together, one of the two coil conductors being used as a resonance circuit coil and the other as a copper resistance compensation coil, and comprises a drive circuit for supplying a drive current to the joint connection end of the two-thread coil for oscillation, and a compensation means for making a current having the same intensity as a current flowing from the first end to the second end of the resonance circuit coil flow from the second end of the resonance circuit coil to the second end of the copper resistance compensation coil to thereby virtually short-circuit a copper resistance Rcu of the resonance circuit coil.

The compensation means comprises an inverting amplifier for inverting and amplifying a voltage generated at the second end of the copper resistance compensation coil and negatively feeding it back to the second end of the resonance circuit coil. Desirably, the inverting amplifier is an operational amplifier arranged to have virtually an infinitely large gain. The copper resistance of the resonance circuit coil is virtually short-circuited by the compensation means (inverting amplifier) in the manner that in an equivalent circuit for the two-thread coil in which a copper resistance of the resonance circuit coil and a copper resistance of the copper resistance compensation coil are each series-connected to an end of a series circuit comprising a self-inductance and an AC resistance of the two-thread coil connected in series, the end of the series circuit is virtually grounded.

In the high-frequency oscillation proximity sensor according to the invention, the drive circuit for supplying a drive current to the joint connection end of the two-thread coil for oscillation may comprise a nonlinear amplifier for changing the oscillation amplitude at the joint connection end depending on change in Q of the two-thread coil.

Desirably, the nonlinear amplifier changes its gain in multiple stages depending on an input voltage to thereby change an output voltage nonlinearly. By this, it changes the amplitude of the oscillating voltage generated at the two-thread coil in multiple stages to thereby impart a soft oscillation characteristic to a high-frequency oscillator circuit comprising the nonlinear amplifier and the two-thread coil.

BEST MODE OF CARRYING OUT THE INVENTION

Figure 1:
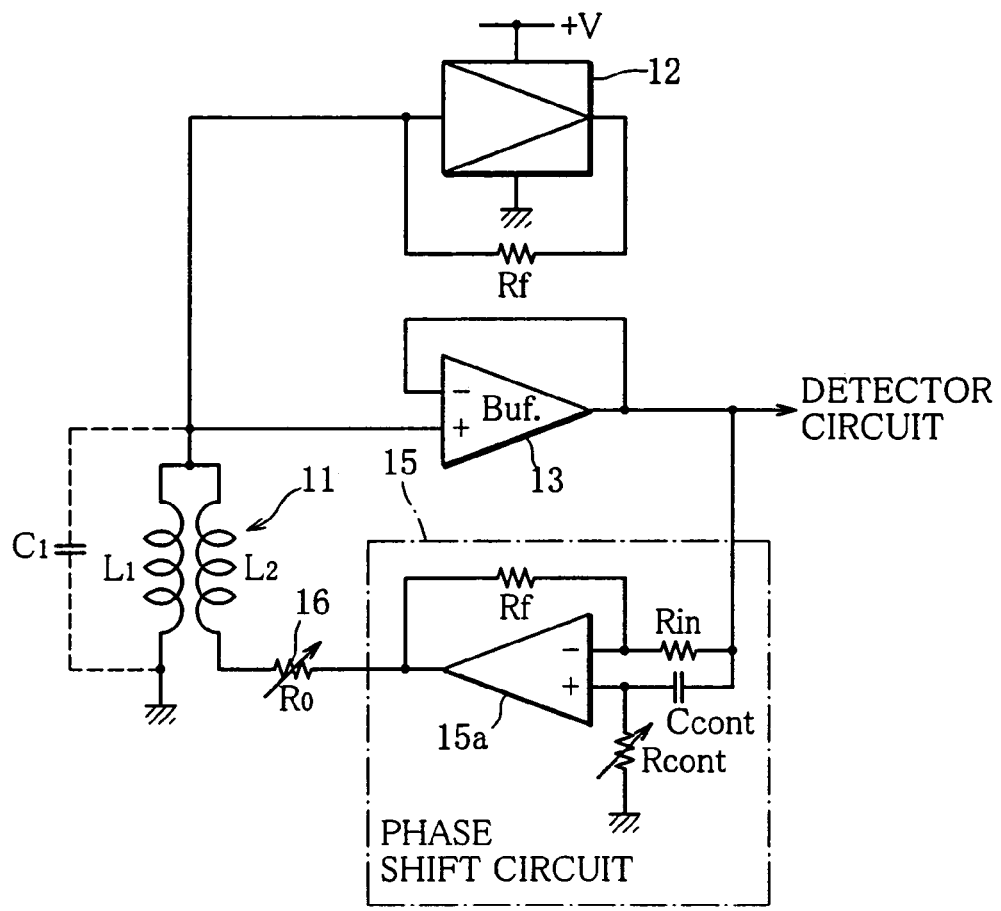
FIG. 1 is a diagram schematically showing a structure of relevant parts of a high-frequency oscillation proximity sensor according to a first embodiment of the invention.

Referring to the drawings, high-frequency oscillation proximity sensors according to embodiments of the invention will be described, focusing on a copper resistance compensation means provided for a detection coil, in particular.

(First embodiment)

FIG. 1 is a diagram schematically showing a structure of relevant parts of a high-frequency oscillation proximity sensor according to a first embodiment. Reference numeral 11 denotes a detection coil which forms part of a high-frequency oscillator circuit. The detection coil 11 is formed of a two-thread coil which is formed of, for example, two high-frequency litz wires (coil conductors) L1, L2 each having a first end and a second end, joined together at their respective first ends to form a joint connection end, twisted together and wound on a bobbin of resin (not shown). In the bobbin, for example, a ferrite core (not shown) is inserted. One L1 of the two coil conductors of the two-thread coil is used as a resonance circuit coil for forming an LC parallel resonator with a capacitor C1 parallel-connected to the coil L1. The other coil conductor L2 is used as a copper resistance compensation coil. Generally, the two-thread coil may be formed of a plurality of high-frequency litz wires (coil conductors) joined together at their respective first ends, twisted together, and divided two ways at their respective second ends to form substantively two coils (threads).

The detection coil 11 formed of the two-thread coil is so arranged that the second end B of the resonance circuit coil L1 parallel-connected to the capacitor C1 is grounded, while the joint connection end A of the resonance circuit coil L1 and the copper resistance compensation coil L2 is connected to an amplifier 12. By supplying a drive current from the amplifier 12, the high-frequency oscillator circuit using the detection coil 11 is driven to oscillate. Basically, the amplifier 12 takes in a voltage which is generated at the joint connection end A of the detection coil 11 when the detection coil 11 is driven to oscillate, amplifies it, converts the amplified voltage into a current, and supplies it to the joint connection end A of the detection coil 11 so that the detection coil 11 will self-oscillate. Thus, the amplifier 12 functions like a negative-resistance device which puts out a current depending on an input voltage, and drives the detection coil 11 to oscillate.

The joint connection end A of the two-thread coil, or the detection coil 11 is connected to a buffer 13 for detecting an oscillating voltage generated at the detection coil 11. The oscillating voltage (output) detected by the buffer 13 is applied to the second end C of the copper resistance compensation coil L2 of the detection coil 11, through a phase shift circuit 15 and a gain control resistor 16. The phase shift circuit 15 comprises, for example, an operational amplifier 15a as a main component. BY giving a phase difference between the output voltage (oscillating voltage) of the buffer 13 supplied to an inverting input terminal (−) and that supplied to an non-inverting input terminal (+), the phase shift circuit 15 turns (shifts) the phase of the output voltage by a predetermined angle. The phase shift angle is determined by circuit constants of a resistor Rcont and a capacitor Ccont connected to the noninverting input terminal of the operational amplifier 15a, and adjusted, for example, by changing the resistance value of the resistor Rcont. The oscillating voltage to which a predetermined phase turn is given by the phase shift circuit 15 is controlled by the gain control resistor 16 regarding the amount to be fed back, and applied to the second end C of the copper resistance compensation coil L2. The voltage applied to the second end C of the copper resistance compensation coil L2 this way compensates for the copper resistance of the detection coil 11.

Figure 2A:
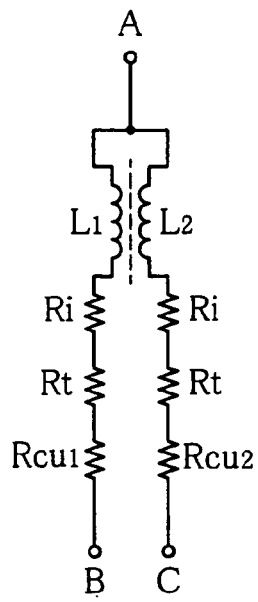
FIG. 2A shows an equivalent circuit for a two-thread coil of FIG. 1.

Here, properties of the detection coil 11 formed of a two-thread coil will be considered. For example, as shown in FIG. 2A, from the viewpoint of equivalence, the detection coil 11 can be considered to have a self-inductance L (L1, L2), ohmic resistances (copper resistances) Rcu1, Rcu2 corresponding to copper losses, an inductive resistance Ri as an AC resistance, and an eddy current loss Rt caused by an object S of detection, separately. Though the eddy current loss Rt is also an AC resistance, it is considered separately from the inductive resistance Ri, because the inductive resistance Ri is a resistance of the coil itself while the eddy current loss Rt is caused by the object S of detection and therefore has a special meaning. The inductive resistance (AC resistance) Ri represents a loss which includes a hysteresis loss, an eddy current loss and a residual loss produced at the ferrite core and a metal case containing the ferrite core, a dielectric loss produced at packing material, a proximity effect loss produced at the wires of the coil itself, and the like.

Figure 2B:
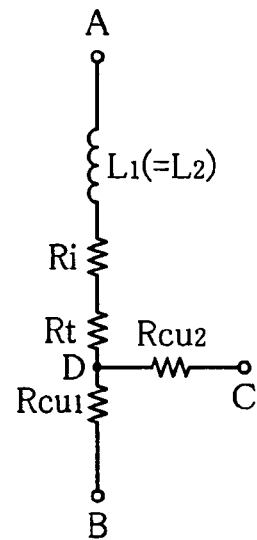
FIG. 2B shows an equivalent circuit for the two-thread coil of FIG. 1 in which copper resistances are separated.

The inventors have carried out evaluation and analysis on the two-thread coil, and found out that when the two coils L1, L2 are connected together in a sufficiently strong manner, the detection coil 11 can be considered as an equivalent circuit in which the copper resistances Rcu1, Rcu2 of the detection coil 11 are separated from the AC resistance Ri and the eddy current loss Rt as shown in FIG. 2B. In other words, when the coil L1 of the detection coil 11 is used as a resonance circuit coil and the other coil L2 is used as a copper resistance compensation coil as mentioned above, the copper resistances Rcu1, Rcu2 of the detection coil 11 can be considered as resistances separated from the inductive resistance Ri and the eddy current loss Rt, as shown in FIG. 2B.

For example, when the coils L1 and L2 are formed by twisting a plurality of high-frequency litz wires of the same diameter together and the ratio of the number of wires of the coil L1 to that of the coil L2 is n:m, the copper resistance Rcu1 of the coil L1 and the copper resistance Rcu2 of the coil L2 are proportional to the reciprocals 1/n, 1/m of the numbers of wires n, m, respectively. Hence, between the copper resistance Rcu1 of the coil L1 and the copper resistance Rcu2 of the coil L2, there is a relationship:

$$Rcu1 = (m/n) \cdot Rcu2.$$

When the number of wires of the coil L1 and that of the coil L2 are the same, there is a relationship [Rcu1=Rcu2].

Suppose that resonance generates an AC voltage between the joint connection point A of the coils L1, L2 and the terminal B of the resonance circuit coil L1 at an angular frequency $\bar{\omega}$. The terminal C of the copper resistance compensation coil L2 is disregarded. In the equivalent circuit of FIG. 2B, at a point D which separates the copper resistances Rcu1, Rcu2, a voltage appears with a phase turned by −90° through the inductance L1 (=L2), and with an amplitude determined by resistance division between the impedance [$\bar{\omega}$L+Ri+Rt] and the copper resistance Rcu1. Hence, if a voltage is given to the point D through the terminal C of the copper resistance compensation coil L2 with the same amplitude as that of the voltage appearing at the point D and a phase turned by +90° from that of the voltage observed at the point A, the amplitude of voltage appearing at the point D can be cancelled out, so that the voltage at the copper resistance Rcu1 can be zero [0V]. Thus, when the part between the terminals A and B of the resonance circuit coil L1 is considered, since the voltage at the point D is zero [0V], the copper resistance Rcu1 of the detection coil 1 is practically lost and the copper resistance Rcu1 can be considered as 0Ω. Thus, by virtually (equivalently) grounding the point D and short-circuiting the copper resistance Rcu1, influence of the copper resistance Rcu1 on the oscillator circuit can be effectively negated.

The buffer 13 and the phase shift circuit 15 apply this voltage to the point D through the terminal C of the copper resistance compensation coil L2 to negate (eliminate) the copper resistance Rcu1 of the detection coil 11 equivalently. As a result, the Q of the detection coil 11 is much improved, and the temperature dependency coming from the copper resistance Rcu1 can be negated. This stabilizes the oscillation generated at the detection coil 11, and therefore stabilizes the operation of the proximity sensor. This also allows the proximity sensor to have a longer detection distance.

When the copper resistance Rcu1 of the detection coil 11 is negated this way, the entire part comprising the detection coil 11, the buffer 13 and the phase shift circuit 15 can be considered as a detection coil having its copper resistance Rcu1 negated, or a coil with a copper resistance negating circuit. Hence, when an amplifier for driving the detection coil 11 to oscillate should be designed, circuit constants can be determined on the basis of a coil having no copper resistance Rcu1. Thus, the amplifier can be designed easily and the circuit structure can be simplified easily.

Figure 3A:
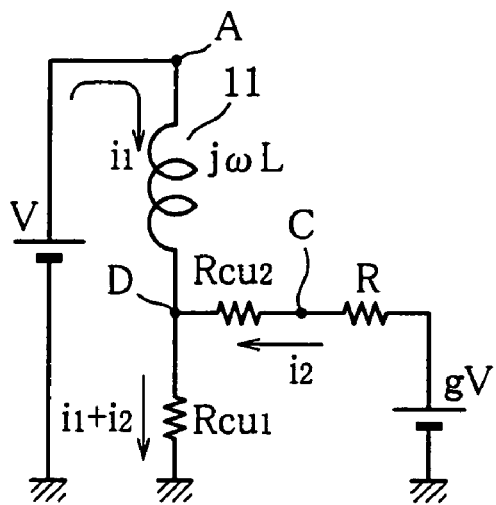
FIG. 3A shows an equivalent circuit for explaining how a copper resistance Rcu of the two-thread coil is negated by feedback through a phase shift circuit.

Next, the function of the buffer 13 in negating the copper resistance Rcu1 of the detection coil 11 will be considered. As seen in an equivalent circuit of FIG. 3A, due to a voltage V generated by oscillation, a current i1 is supplied to the inductance L of the detection coil 11 through the joint connection point A. Also, from the phase control circuit 15, a current i2 is supplied through the terminal C and the gain control resistor ($R_O$) 16. The currents i1 and i2 are joined together at the point D which separates the copper resistances Rcu1, Rcu2 and flow into the copper resistance Rcu1. Thus, the voltage V generated at the detection coil 1 can be expressed as $$V = i1 \cdot j\overline{\omega}L + (i1+i2) \cdot Rcu1 \quad (1).$$

The voltage gV which should be fed back from the buffer 13 to the terminal C of the copper resistance compensation coil L2 can be expressed as $$gV = (i1+i2) \cdot Rcu1 + i2(Rcu2 + R_O) \quad (2),$$

where g is the gain of the feedback circuit. Negating the copper resistance Rcu1 means making the currents (i1+i2) flowing into the copper resistance Rcu1 zero (0). Hence, when the resistance value $R_O$ of the gain control resistor 16 is sufficiently larger than the copper resistance Rcu2 (Rcu2<<$R_O$), it is apparent from the expressions (1) and (2) that the gain g should be approximately $$g = +j \cdot (R_O / \overline{\omega} L).$$

Figure 3B:
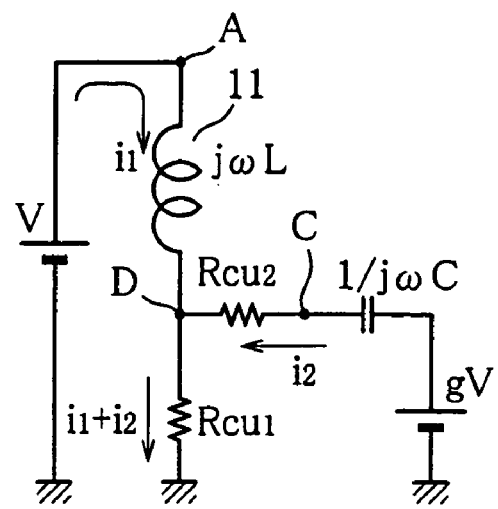
FIG. 3B shows an equivalent circuit for explaining how a copper resistance Rcu of the two-thread coil is negated by feedback through a capacitor.
Figure 12:
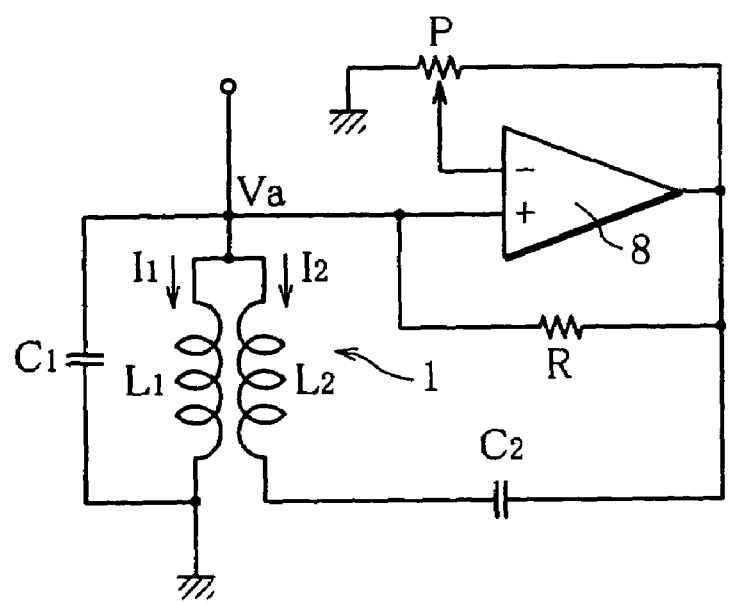
FIG. 12 is a diagram showing a conventional example of a copper resistance compensation circuit for a detection coil.

In contrast, as in the conventional example of FIG. 12, if, in place of the output voltage of the phase shift circuit 15, the output voltage of the buffer 13 is fed back to the detection coil 11 with its phase turned simply through the capacitor C2, the equivalent circuit is as shown in FIG. 3B, and the voltage gV which should be fed back from the buffer 13 is $$gV = (i1+i2) \cdot Rcu1 + i2 \cdot (Rcu2 + 1/j\overline{\omega}C) \quad (3).$$

When the impedance ($1/j\overline{\omega}C$) of the capacitor C2 is sufficiently larger than the copper resistance Rcu2 (Rcu2<<$1/j\overline{\omega}C$), the required gain g of the buffer 13 is approximately $$g = 1/\overline{\omega}^2 LC.$$

This means that when the output voltage of the buffer 13 should be fed back to the detection coil 11 with its phase turned simply through the capacitor C2, the amplitude of the voltage required for compensating for the copper resistance Rcu1 is inversely proportional to the square ($\overline{\omega}^2$) of the oscillation angular frequency $\overline{\omega}$. In contrast, when the phase of the output voltage of the buffer 13 is turned using the phase shift circuit 15 as mentioned above, the amplitude of the voltage required for compensating for the copper resistance Rcu1 only needs to be inversely proportional to the oscillation angular frequency $\overline{\omega}$. Hence, when the copper resistance Rcu1 should be negated by turning the phase of the voltage which should be fed back to the detection coil 11 using the phase shift circuit 15, the gain only needs to be inversely proportional to the first power of the oscillation angular frequency $\overline{\omega}$. Hence, the circuit can be designed more easily than when the phase is turned using the capacitor C2, and the stability of the copper resistance compensation improves. This also produces effects such that the frequency dependency of the circuit can be reduced.

Further, when the phase shift circuit 15 is used like this, if external temperature-sensitive resistors such as thermistors are attached to the gain control resistor ($R_O$) 16, the phase shift amount control resistor (Rconst) and the like, the phase shift characteristics of the phase shift circuit can be easily fine-adjusted using them. Thus, the copper resistance Rcu can be effectively negated, and therefore, the temperature dependency of the copper resistance Rcu can be negated.

(Second Embodiment)

Figure 4:
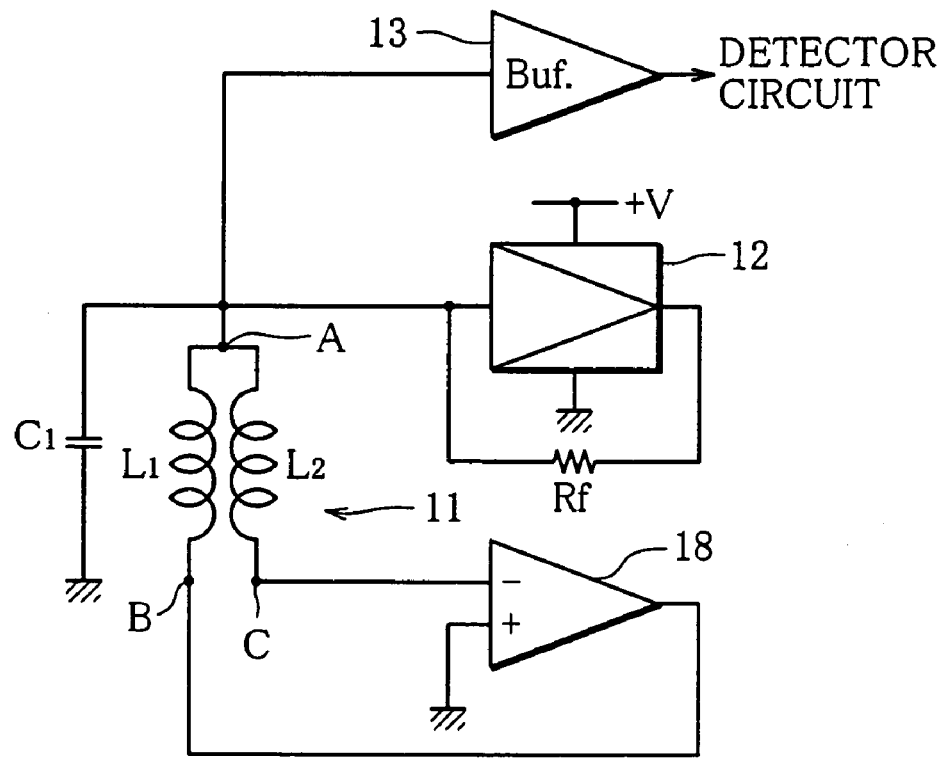
FIG. 4 is a diagram schematically showing a structure of relevant parts of a high-frequency oscillation proximity sensor according to a second embodiment of the invention.

FIG. 4 is a diagram schematically showing a structure of relevant parts of a high-frequency oscillation proximity sensor according to a second embodiment. In this high-frequency oscillation proximity sensor, a drive current is supplied from an amplifier 12 to a joint connection end A of a detection coil 11 formed of a two-thread coil as described above to drive the detection coil 11 to oscillate, while a voltage generated at a terminal C of a copper resistance compensation coil L2 is fed back to a terminal B of a resonance circuit coil L1 through an inverting amplifier 18 to compensate for a copper resistance Rcu1 of the detection coil 11.

Specifically, the inverting amplifier 18 is, for example, an operational amplifier (op-amp) of which a non-inverting input terminal (+) is grounded and an inverting input terminal (−) receives an input voltage to invert. The second end C of the copper resistance compensation coil L2 of the two-thread coil is connected to the inverting input terminal of the operational amplifier (inverting amplifier 18), while the second end B of the resonance circuit coil L1 is connected to an output terminal of the operational amplifier (inverting amplifier 18).

Figure 5:
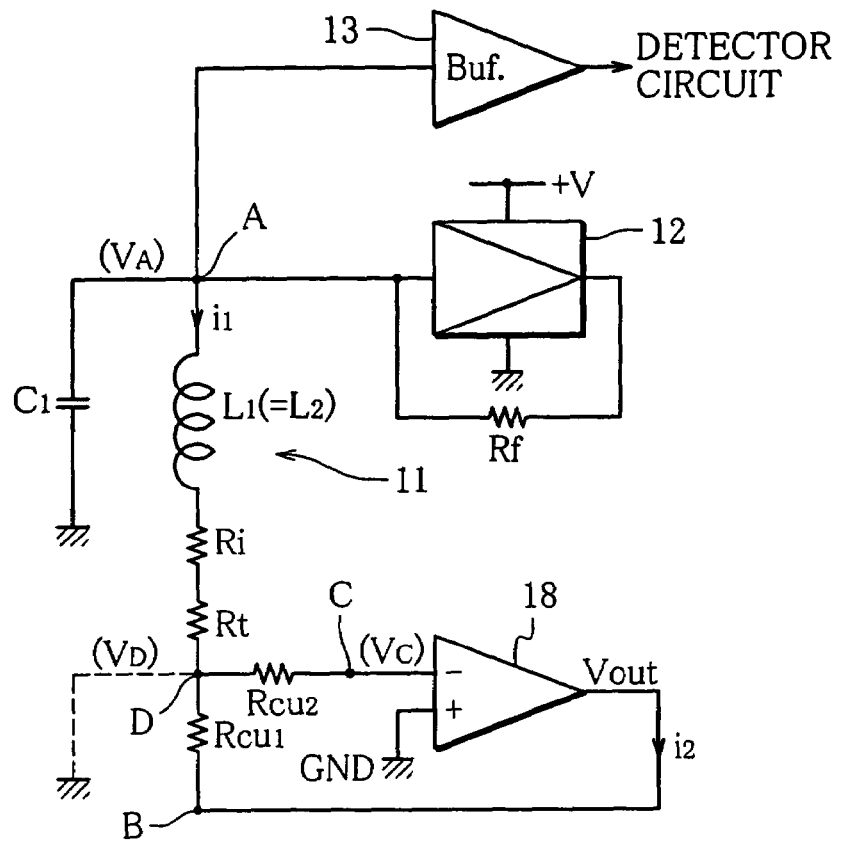
FIG. 5 shows an equivalent circuit for an oscillator circuit of FIG. 4.

The oscillator circuit having the above structure can be represented as shown in FIG. 5, using an equivalent circuit for the detection coil 11 as shown in FIG. 2B. Specifically, a copper resistance Rcu2 of the copper resistance compensation coil L2 of the detection coil 11 is connected to the inverting input terminal (−) of the inverting amplifier 18. Since an input impedance of the inverting amplifier 18 is sufficiently large, no current flows into the inverting input terminal (−). Hence, a voltage drop does not occur at the copper resistance Rcu2 of the copper resistance compensation coil L2, so that the potential $V_C$ of the point C is always equal to the potential $V_D$ of the point D. Thus, the value of the copper resistance Rcu2 of the copper resistance compensation coil L2 is irrelevant to the detection coil 11.

Further, since the non-inverting input terminal (+) of the inverting amplifier 18 is grounded, the output voltage of the inverting amplifier 18 is negative (−) when the potential $V_D$ of the point D is positive [$V_D$>0] with reference to the ground voltage (0V). Conversely, the output voltage of the inverting amplifier 18 is positive (+) when the potential $V_D$ of the point D is negative [$V_D$<0].

The inverting amplifier 18 forms a feedback loop so that the potential of the inverting input terminal (−) will be always equal to the potential of the non-inverting input terminal (+) ($V_C$=$V_D$). This means that the inverting amplifier 18 operates so that the potential of the point C will be equal to the potential of the non-inverting input terminal (+) of the inverting amplifier 18, namely the ground voltage [0V]. Consequently, control is performed so that the potential $V_C$ of the point C will be always equal to the potential $V_D$ of the point D as mentioned above and [$V_D$=0V]. This means that the point D is virtually grounded.

Hence, in the oscillator circuit having the above-described structure, the copper resistance Rcu1 of the detection coil 11 in the parallel resonance circuit formed by the detection coil 11 and the capacitor C1 can be virtually short-circuited. Hence, the resonance circuit has an inductance L of the resonance circuit coil L1, an AC resistance Ri thereof, an eddy current loss Rt caused by an object of detection, and the capacitor C1 as shown in FIG. 5, and no current flows from the resonance circuit to the copper resistance Rcu1 of the detection coil 11.

Figure 6:
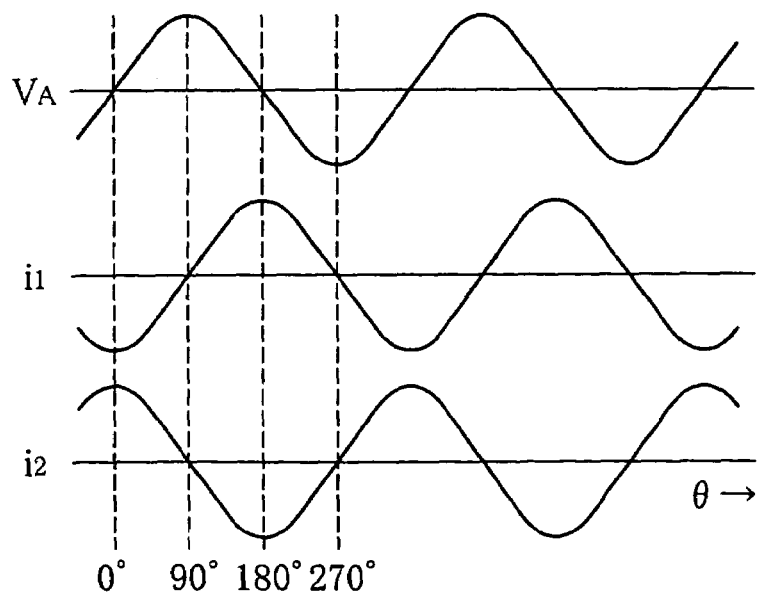
FIG. 6 is a diagram showing relationship between a voltage and currents generated at a detection coil of the oscillator circuit of FIG. 4.

More specifically, the AC resistance Ri of the resonance circuit coil L1 and the eddy current loss Rt are sufficiently smaller than the reactance $\overline{\omega}L1$ of the detection coil 11. Hence, when a voltage $V_A$ is generated at the point A due to the inductance L1 of the detection coil 11, a current i1 flowing through the resonance circuit coil L1 has a phase delayed by 90° relative to the phase of the voltage $V_A$ as shown in FIG. 6. Due to this current i1, a voltage drop [Rcu1·i1] occurs at the ohmic resistance Rcu1 corresponding to the copper loss of the resonance circuit coil L1.

As mentioned above, the output voltage Vout of the inverting amplifier 18 is so generated that the potential $V_D$ of the point D will be always zero [0]. Hence, there is a relationship $V\text{out}-V_D=V\text{out}=-\text{Rcu1}\cdot i1=\text{Rcu2}\cdot i2$.

Between the currents i1 and i2, there is a relationship $i1=-i2$ as shown in FIG. 6. In other words, by making the current i2 flow from the inverting amplifier 8 with an intensity equal to the intensity of the current i1 and with a phase opposite to the phase of the current i1 which flows into the copper resistance Rcu1 of the resonance circuit coil L1, the point D is virtually (equivalently) grounded and the copper resistance Rcu1 is virtually short-circuited. As a result, the point D is virtually grounded so that the potential $V_D$ thereof will be zero [0], and the influence of the copper resistance Rcu1 of the resonance circuit coil L1 is negated.

Further, by virtually grounding the point D as mentioned above, it is arranged that no current flows into the copper resistance Rcu1 of the resonance circuit coil L1. Thus, when the part between the terminals A and B of the resonance circuit coil L1 is considered, the potential of the point D is zero [0V]. Hence, the copper resistance Rcu1 of the detection coil 1 is practically lost, and the copper resistance Rcu1 can be considered as 0Ω.

In the oscillator circuit having the above-described structure, the copper resistance Rcu1 of the detection coil 1 can be virtually short-circuited. Hence, like the first embodiment, the Q ratio of the detection coil 1 can be much improved. Further, by negating the temperature dependency coming from the copper resistance Rcu1, the oscillation of the detection coil 11 can be stabilized, and therefore, the operation of the proximity sensor can be stabilized. This also allows the proximity sensor to have a longer detection distance and higher detection accuracy.

In the above-described oscillator circuit, the potential of the point D is kept at 0V through the inverting amplifier 18. The current flowing from the inverting amplifier 18 has the same intensity and frequency as those of the current flowing into the ohmic resistance Rcu1 of the resonance circuit coil L1 and a phase opposite to, or 180° different from the phase thereof. Hence, even when the resonance frequency of the resonance circuit has changed, so that the frequency of the current flowing into the ohmic resistance Rcu1 of the resonance circuit coil L1 has changed, a current having the same frequency as that of the current which has changed and a phase opposite to the phase thereof flows from the inverting amplifier 18 to the copper resistance Rcu1 of the resonance circuit coil L1. Hence, change of virtual grounding due to the change of the frequency is prevented, and the copper resistance Rcu1 can be surely short-circuited. Thus, there is no need to provide a circuit for compensating for change of circuit constants due to the change of the frequency. In particular, circuit constants for the detection coil can be determined assuming that the resonance circuit coil L1 does not have a copper resistance Rcu1. Hence, the detection coil can be designed easily and the circuit structure can be simplified easily.

Further, by means of the inverting amplifier 18, the point D is virtually grounded so that the potential thereof will always be 0V. Hence, the influence of the copper resistance Rcu1 of the resonance circuit coil L1 can be negated effectively, regardless of differences in characteristics of individual parts.

In order to verify that the copper resistance of the coil of the oscillator circuit is compensated for, the inventors measured the resistance of a detection coil used for a high-frequency oscillation proximity sensor, under different conditions. Specifically, the resistance value of the detection coil was measured at an ordinary ambient temperature (25° C.), a low ambient temperature (−25° C.) and a high ambient temperature (70° C.), at the oscillation frequency of 200 kHz.

Figure 7:
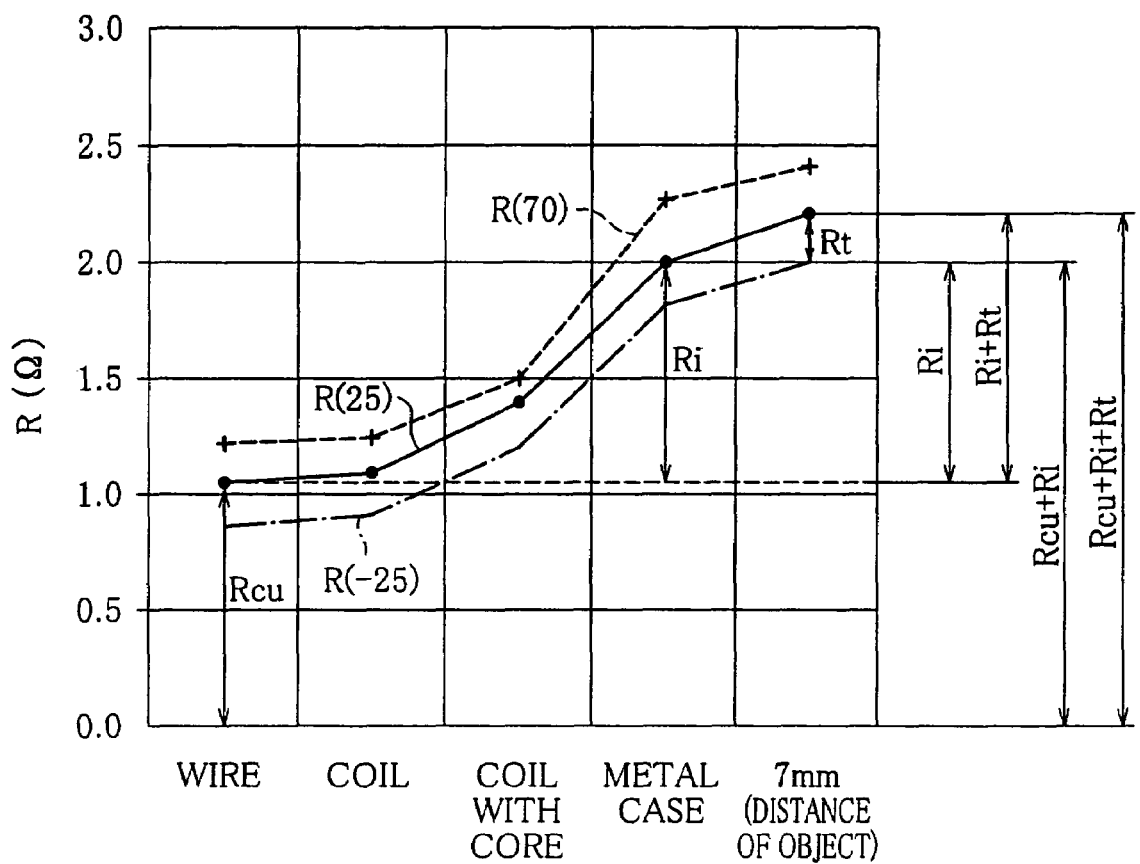
FIG. 7 is a diagram showing a result of measurement of internal resistance of a detection coil.

FIG. 7 is a graph showing the result of the measurement performed under the above-mentioned temperature conditions. Specifically, the resistance value of the coil was measured in the state that a wire was not wound into the coil yet, in the state that the wire was wound on a bobbin, in the state that a core was inserted in the bobbin, in the state that they were contained in a metal case, and in the state that an object S of detection was moved closer up to a 7 mm distance from the detection coil. In the graph, the copper resistance Rcu of the detection coil 1, the AC resistance Ri thereof and the eddy current loss Rt caused by the object S of detection are piled up.

The result of the experiment reveals that the copper resistance Rcu of the wire itself, of which the coil was formed, was about 0.87Ω to about 1.23Ω in the temperature range of −25° C. to 70° C. The resistance value measured in the state that the wire was formed into the detection coil and contained in the metal case was about 1.8Ω to about 2.27Ω in the temperature range of −25° C. to 70° C., due to the AC resistance Ri added. When the object S of detection was moved closer (up to a 7 mm distance), the eddy current loss occurred in the object, which caused the eddy current loss Rt in the coil.

As seen in the graph, the ratio of the copper resistance Rcu to the whole resistance of the detection coil is large, and the copper resistance Rcu has a large influence on the characteristics of the coil when the temperature changes. When the copper resistance compensation circuit was not used, the Q ratio of the measured coil was $$Q \text{ ratio}=(Rcu+Ri)/(Rcu+Ri+Rt)=91[\%].$$

When the copper resistance compensation circuit according to the invention was used, the Q ratio of the coil was $$Q \text{ ratio}=Ri/(Ri+Rt)=80[\%].$$

This means that by applying the copper resistance compensation circuit according to the invention to the measured coil, the Q ratio was improved by 11% or so. This clearly shows the effect produced by providing a point virtually grounded so that the copper resistance will be virtually short-circuited.

(Third Embodiment)

Figure 8:
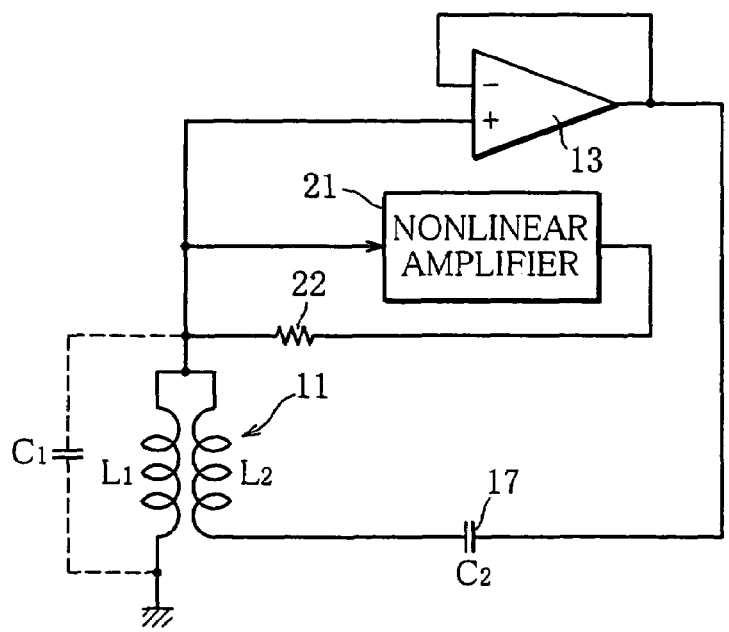
FIG. 8 is a diagram schematically showing a structure of relevant parts of a high-frequency oscillation proximity sensor according to a third embodiment of the invention.

For a high-frequency oscillation proximity sensor which can detect an object S of detection at a plurality of points, or distances as the object S moves closer, it is necessary to construct a so-called soft oscillation circuit which has an operating characteristic such that the oscillation amplitude changes depending on the distance of the object S of detection. Basically, by using, for example, a nonlinear amplifier 21 as shown in FIG. 8 as an amplifier 12 for driving a detection coil 11 to oscillate, the desired soft oscillation circuit can be constructed.

Needless to say, the nonlinear amplifier 21 can be used in place of the amplifier 12 in the oscillator circuit of FIG. 1 or in place of the amplifier 12 in the oscillator circuit of FIG. 4.

Figure 9:
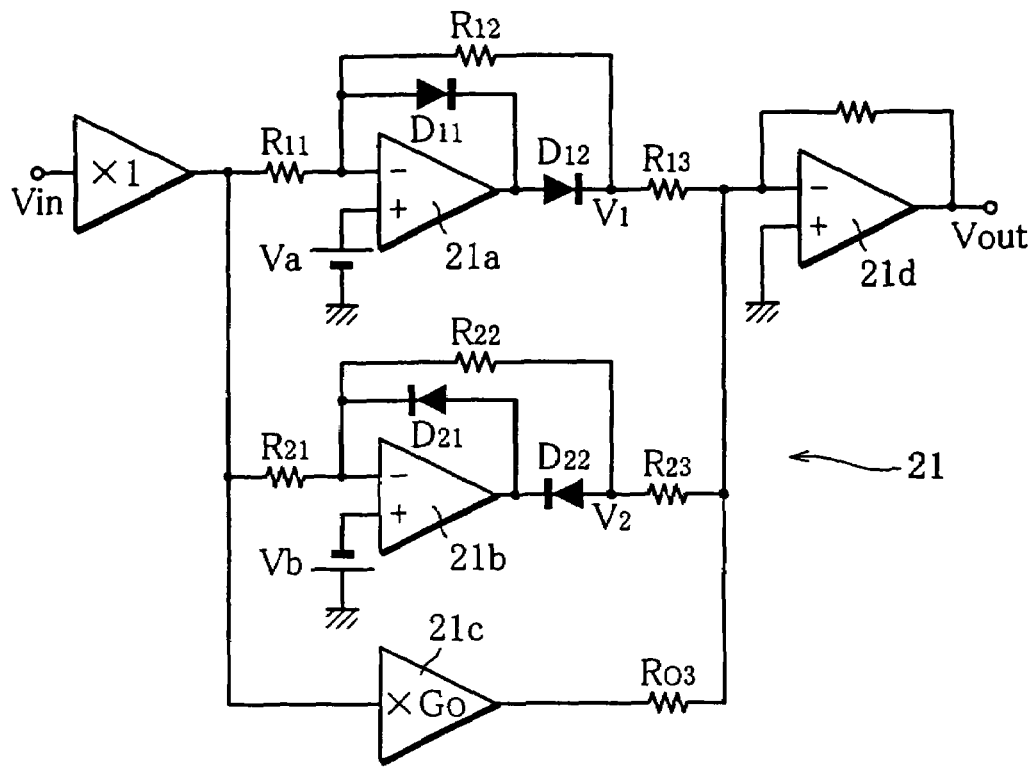
FIG. 9 shows a diagram showing an example of a structure of a nonlinear amplifier included in the high-frequency oscillation proximity sensor of FIG. 8.

The nonlinear amplifier 21 changes the amplitude of oscillation generated at the detection coil 11, depending on change in Q of the detection coil 11. FIG. 9 schematically shows an example of structure of the nonlinear amplifier 21. As seen there, a first amplifier 21a biased with a first reference voltage Va, a second amplifier 21b biased with a second reference voltage Vb (=−Va), and a third amplifier 21c having a predetermined gain ($G_0$) are provided in parallel, and the amplified outputs of the amplifiers 21a, 21b, 21c are added and put out by an output amplifier 21d.

The bias voltage Vin1 of the first amplifier 21a is given as $$Vin1=[1+R11/(R12+R13)]Va.$$

A diode D11 is parallel-connected between an input terminal and an output terminal of the first amplifier 21a, and a diode D12 is series-connected to the output terminal of the first amplifier. The gain of the first amplifier by which an input voltage Vin is increased is changed by selectively bypassing a feedback loop including a resistor R12, depending on whether the input voltage Vin is higher than the bias voltage Vin1 or not. Thus, when the input voltage Vin is not higher than the bias voltage Vin1 [Vin≦Vin1], the first amplifier 21a has an output voltage V01 expressed as $$V01=-Vin(R12/R11)+(1+R12/R11)Va.$$

When the input voltage Vin is higher than the bias voltage Vin1 [Vin≧Vin1], the first amplifier 21a has a constant output voltage V01 expressed as $$V01=[R13/(R12+R13)]Va.$$

The bias voltage Vin2 of the second amplifier 21b is given as $$Vin2=[1+R21/(R22+R23)]Vb.$$

A diode D21 is parallel-connected between an input terminal and an output terminal of the second amplifier 21b, and a diode D22 is series-connected to the output terminal of the second amplifier 21b. The gain of the second amplifier by which an input voltage Vin is increased is changed by selectively bypassing a feedback loop including a resistor R22, depending on whether the input voltage Vin is lower than the bias voltage Vin2 or not. Thus, when the input voltage Vin is not lower than the bias voltage Vin2 [Vin≧Vin2], the second amplifier 21a has an output voltage V02 expressed as $$V02=-Vin(R22/R21)+(1+R22/R21)Vb.$$

When the input voltage Vin is lower than the bias voltage Vin2 [Vin≦Vin1], the second amplifier 21a has a constant output voltage V02 expressed as $$V02=[R23/(R22+R23)]Vb.$$

Figure 10:
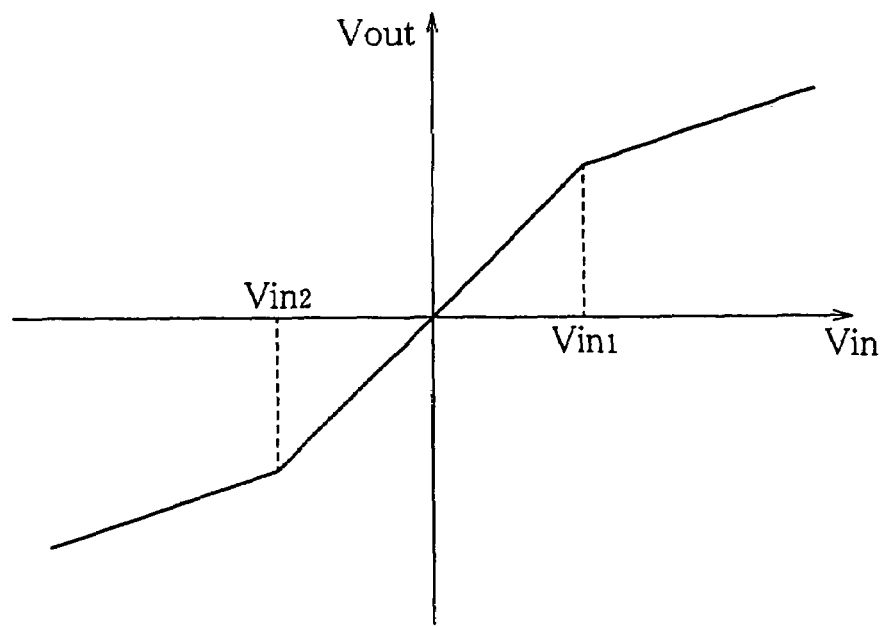
FIG. 10 is a diagram showing an input-output characteristic of the nonlinear amplifier of FIG. 9.
Figure 11:
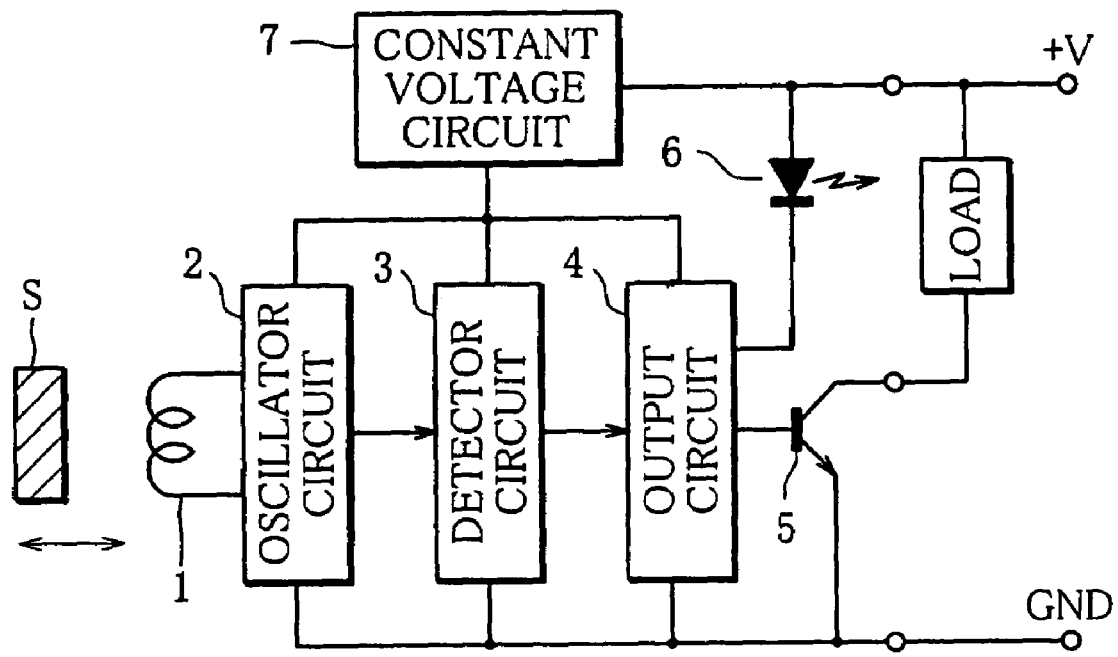
FIG. 11 is a block diagram schematically showing a common structure of a high-frequency oscillation proximity sensor.

In the nonlinear amplifier 21, the amplified outputs V01, V02 of the first and second amplifiers 21a, 21b and the amplified output of the third amplifier 21c are added by the output amplifier 2d. Thus, the nonlinear amplifier 21 as a whole changes its gain depending on the input voltage Vin, and has a nonlinear input-output characteristic like an example shown in FIG. 10. The nonlinear amplifier 21 takes in an amplitude voltage $V_A$ generated at the detection coil 11 as the input voltage Vin. The output voltage Vout of the nonlinear amplifier 21 is converted to a current through the resistor 22 and supplied to the detection coil 11 to drive the detection coil 11 to oscillate.

In the oscillator circuit shown in FIG. 8, a buffer 13 is provided to take out a voltage generated at the detection coil 11. The output of the buffer 13 is fed back to the copper resistance compensation coil L2 of the detection coil 11 after the phase thereof is turned by 90° through a capacitor 17. As mentioned above, the buffer 13 and the capacitor 17 form a compensation circuit for negating the copper resistance Rcu of the detection coil 11. By negating the copper resistance Rcu, the compensation circuit improves the Q ratio of the detection coil 1 and negates the temperature dependency of the detection coil 11.

As mentioned above, when a phase shift circuit 15 as shown in FIG. 1 is used in place of the capacitor 17, the gain can be determined to be inversely proportional to the first power of the oscillation angular frequency $\bar{\omega}$. In this case, the circuit can be designed more easily than when the phase is turned using the capacitor 17. This also produces effects such that the copper resistance can be more stably compensated for, and that the frequency dependency can be reduced.

Specifically, the use of the phase shift circuit 15 can increase the stability of copper resistance negation against the change in oscillation frequency, much alleviate requirements on the nonlinear amplifier 2 for soft oscillation, and reduce the frequency dependency. Hence, it produces effects such that soft oscillation can be achieved by the nonlinear amplifier 21 more easily.

Similar effects can be produced when the nonlinear amplifier 21 is used in place of the amplifier 12 in the oscillator circuit shown in FIG. 4.

The invention is not limited to the above-described embodiments. The oscillation frequency, the detection sensitivity and the like may be determined according to a specific arrangement. The above description has been made assuming that the detection coil 11 is made of copper wires and that the copper resistance thereof should be negated. However, even when the detection coil 11 is made of conductors of aluminum or the like, the internal resistance thereof can be negated in the same way. Needless to say, the circuit constants and the like may be determined according to a specific arrangement. To sum up, various modifications can be made to the invention without deviating from the gist thereof.

INDUSTRIAL APPLICABILITY

In the invention, the internal resistance of the detection coil is virtually short-circuited by feeding an oscillating output voltage generated at a detection coil formed of a two-thread coil back to the detection coil with its phase turned. By this, the Q and the Q ratio of the detection coil can be improved, the detection sensitivity thereof can be improved, and the temperature dependency coming from the internal resistance of the coil can be negated. Further, the internal resistance can be virtually short-circuited with a simple structure using a phase shift circuit or an inverting amplifier. Thus, the invention can provide a high-frequency oscillation proximity sensor having high detection sensitivity and stable operating characteristics. The practical advantage thereof is large.

What is claimed is:

1. A high-frequency oscillation proximity sensor, comprising:
    a two-thread coil formed of two coil conductors each having a first end and a second end, joined together at their respective first ends to form a joint connection end and twisted together, one of the two coil conductors being used as a resonance circuit coil and the other as an internal resistance compensation coil,
    a drive circuit for supplying a drive current to the joint connection end of the two-thread coil for oscillation,
    a compensation means for making a current having the same intensity as a current flowing from the first end to the second end of the resonance circuit coil flow from the second end of the resonance circuit coil to the second end of the internal resistance compensation coil to thereby virtually short-circuit an internal resistance of the resonance circuit coil.

2. The high-frequency oscillation proximity sensor according to claim 1, wherein the internal resistance of the resonance circuit coil is virtually short-circuited by the compensation means in the manner that in an equivalent circuit for the two-thread coil in which an internal resistance of the resonance circuit coil and an internal resistance of the internal resistance compensation coil are each series-connected to a joint connection point of a series circuit comprising a self-inductance of the two-thread coil and an AC resistance thereof connected in series, said joint connection point is virtually grounded.

3. The high-frequency oscillation proximity sensor according to claim 1, wherein the compensation means comprises an inverting amplifier for inverting and amplifying a voltage generated at the second end of the internal resistance compensation coil and negatively feeding it back to the second end of the resonance circuit coil.

4. The high-frequency oscillation proximity sensor according to claim 3, wherein the inverting amplifier is an operational amplifier arranged to have virtually an infinitely large gain.

5. The high-frequency oscillation proximity sensor according to claim 1, wherein the drive circuit for supplying a drive current to the joint connection end of the two-thread coil for oscillation comprises a nonlinear amplifier for changing the oscillation amplitude at the joint connection end depending on change in Q of the two-thread coil.

6. The high-frequency oscillation proximity sensor according to claim 5, wherein the nonlinear amplifier changes the amplitude of the oscillating voltage generated at the two-thread coil in multiple stages to thereby impart a soft oscillation characteristic to a high-frequency oscillator circuit comprising the nonlinear amplifier and the two-thread coil.

* * * * *